United States Patent
Akaki et al.

(10) Patent No.: US 8,012,388 B2
(45) Date of Patent: Sep. 6, 2011

(54) METHOD FOR PRODUCING STRETCHABLE SHEET

(75) Inventors: Kenichi Akaki, Kanagawa (JP);
Yoshihiko Matsumoto, Kanagawa (JP);
Shinichi Ishikawa, Kanagawa (JP)

(73) Assignee: Uni-Charm Corporation, Ehime (JP)

( * ) Notice: Subject to any disclaimer, the term of this patent is extended or adjusted under 35 U.S.C. 154(b) by 115 days.

(21) Appl. No.: 12/444,657

(22) PCT Filed: Dec. 7, 2007

(86) PCT No.: PCT/JP2007/073693
§ 371 (c)(1),
(2), (4) Date: May 12, 2009

(87) PCT Pub. No.: WO2008/078533
PCT Pub. Date: Jul. 3, 2008

(65) Prior Publication Data
US 2010/0065984 A1 Mar. 18, 2010

(30) Foreign Application Priority Data

Dec. 25, 2006 (JP) ................................ 2006-347471

(51) Int. Cl.
*B29C 55/04* (2006.01)
*B29C 55/06* (2006.01)
*B29C 71/00* (2006.01)

(52) U.S. Cl. ............ 264/40.1; 264/40.6; 264/288.4; 264/288.8; 264/348

(58) Field of Classification Search .............. 264/210.7, 264/237, 288.4, 288.8, 348, 40.1, 40.6
See application file for complete search history.

(56) References Cited

U.S. PATENT DOCUMENTS

| 6,039,555 A | 3/2000 | Tsuji et al. |
| 2004/0132374 A1 | 7/2004 | Kobayashi |

(Continued)

FOREIGN PATENT DOCUMENTS

CN 1681985 10/2005
(Continued)

OTHER PUBLICATIONS

Office Action issued by the Eurasian Patent Office for corresponding Application No. 200900506/31, issued Aug. 10, 2010.

(Continued)

*Primary Examiner* — Leo B Tentoni
(74) *Attorney, Agent, or Firm* — Lowe, Hauptman, Ham & Berner, LLP

(57) ABSTRACT

A stretchable sheet having a large stretch amount is produced by increasing a drawing amount given to the nonwoven fabric. A method for producing the stretchable sheet from a nonwoven fabric containing a plurality of types of fibers, that is the nonwoven fabric having a longitudinal direction, a width direction and a thickness direction. The method includes a first drawing step of drawing the nonwoven fabric in the longitudinal direction by applying a tension in the longitudinal direction of the nonwoven fabric, and a second drawing step of drawing, in the longitudinal direction, the nonwoven fabric that has been drawn in the first drawing step with a plurality of teeth formed on outer circumferential faces of each of a pair of gear rolls, the drawing being performed by passing the nonwoven fabric through a gap between the gear rolls that rotate while the teeth are being engaged with one another.

17 Claims, 9 Drawing Sheets

U.S. PATENT DOCUMENTS

2004/0140047 A1     7/2004   Sato et al.
2005/0248051 A1*   11/2005   Cancio et al. ................. 264/154
2005/0255297 A1*   11/2005   Otsuka et al. ................. 428/174

FOREIGN PATENT DOCUMENTS

| | | |
|---|---|---|
| JP | 09-234221 A | 9/1997 |
| JP | 2003-073967 A | 3/2003 |
| JP | 2003-153946 A | 5/2003 |
| JP | 2004-131918 A | 4/2004 |
| JP | 2005-111908 A | 4/2005 |
| JP | 2006-022450 A | 1/2006 |

OTHER PUBLICATIONS

ISR for PCT/JP2007/073693 dated Mar. 18, 2008.
Chinese Office Action for Application No. 200780042509.0 mailed Oct. 18, 2010.
Ukrainian Office Action for Application No. 200904726 mailed Dec. 14, 2010.

* cited by examiner

WITH NO BACKLASH          WITH BACKLASH

WITH NO BACKLASH          WITH BACKLASH

METHOD FOR PRODUCING STRETCHABLE SHEET

RELATED APPLICATIONS

The present application is based on International Application Number PCT/JP2007/073693 filed Dec. 7, 2007, and claims priority from Japanese Application Number 2006-347471 filed Dec. 25, 2006, the disclosures of which are hereby incorporated by reference herein in their entirety.

TECHNICAL FIELD

The present invention relates to methods for producing stretchable sheets.

BACKGROUND ART

In a disposable diaper 1 as an example of sanitary materials, as shown in FIG. 1, a stretchable sheet 3a is often used for a fastening member (portions of a front body 1a or a rear body 1b for example) that is fastened around the torso of a wearer. This stretchable sheet 3a is produced by, for example, performing a drawing processing on a nonwoven fabric 3 as a material for the stretchable sheet 3a. And, a method so-called "gear drawing" is known as an example of the drawing processing (refer to JP-A-2003-73967, for example).

DISCLOSURE OF INVENTION

Problems to be Solved by the Invention

This "gear drawing" is a method in which, as its name suggests, a nonwoven fabric 3 is drawn by a pair of upper and lower gear rolls 41 and 43 in which teeth 41t and 43t are each formed on outer circumferential faces 41a and 43a thereof (see FIG. 2). More specifically, the nonwoven fabric 3 is passed through a space between the pair of upper and lower gear rolls 41 and 43, and then the nonwoven fabric 3 is deformed into a shape bent at three points by the teeth 41t and 43t of the upper and lower gear rolls 41 and 43 that are engaged with one another so as to be drawn, as shown in the right enlarged view in FIG. 2. And, after such drawing, stretchability is developed in the nonwoven fabric 3, thereby becoming a stretchable sheet 3a.

Here, the stretch amount developed in the stretchable sheet 3a increases as the drawing amount during the gear drawing increases. Therefore, the drawing amount during the above gear drawing is preferably increased as much as possible. Also, the drawing amount can be increased by increasing an engagement depth L of the teeth 41t and 43t of the upper and lower gear rolls 41 and 43 shown in FIG. 2. For example, the engagement depth L shown in FIG. 3A can be increased to an engagement depth L' shown in FIG. 3B.

However, as shown in FIG. 3B, if the engagement depth L' is increased, a fluctuation in the relative positions of the teeth 41t and 43t in the rotational direction increases which is caused by the backlash of gears in the rotational drive system (not shown) of the upper and lower gear rolls 41 and 43 or the like. As a result, the teeth 41t of the upper gear roll 41 and the teeth 43t of the lower gear roll 43 become easier to contact each other as shown in FIG. 3B, and at worst the nonwoven fabric 3 is broken. That is, it is difficult only by the gear drawing to give a large drawing amount to the nonwoven fabric 3.

The present invention has been contrived in view of above conventional problems, and it is an object thereof to provide a method for producing a stretchable sheet that is capable of increasing the drawing amount given to a nonwoven fabric and thereby producing the stretchable sheet expressing a large stretch amount.

Means for Solving the Problems

In order to achieve the above-described advantages, a principal aspect of the invention is a method for producing a stretchable sheet from a nonwoven fabric containing a plurality of types of fibers, the nonwoven fabric having a longitudinal direction, a width direction and a thickness direction, the method including:

a first drawing step of drawing the nonwoven fabric in the longitudinal direction by applying a tension in the longitudinal direction, and a second drawing step of drawing, in the longitudinal direction, the nonwoven fabric that has been drawn in the first drawing step with a plurality of teeth formed on an outer circumferential face of each of a pair of gear rolls, the drawing being performed by passing the nonwoven fabric through a gap between the gear rolls that rotate while the plurality of teeth being engaged with one another.

Features of the invention other than the above will become clear by the description of the present specification and the accompanying drawings.

Effect of the Invention

According to the present invention, it is possible to provide a method for producing a stretchable sheet that is capable of increasing the drawing amount given to a nonwoven fabric, thereby producing the stretchable sheet expressing a large stretch amount.

LIST OF REFERENCE NUMERALS

Figure 1:
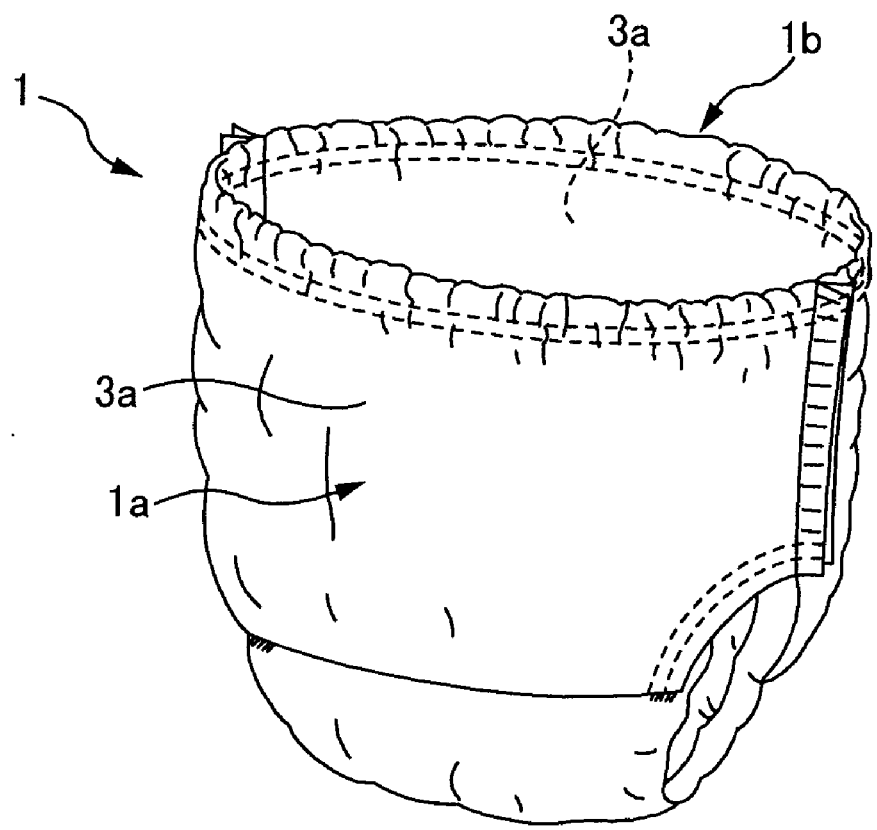
FIG. 1 is a perspective view of a disposable diaper 1.

1 . . . disposable diaper, 1a . . . front body, 1b . . . rear body, 3 . . . nonwoven fabric, 3a . . . stretchable sheet, 3ar . . .

stretchable-sheet roll, 3r . . . nonwoven fabric roll, 11 . . . rolling-out reel device, 21 . . . heating roller (roller, heater), 21a . . . outer circumferential face, 22 . . . pressing roller, 24 . . . heating element, 31 . . . guide roller, 31a . . . outer circumferential face, 32 . . . pressing roller, 40 . . . drawing device, 40h . . . housing, 41 . . . gear roll, 41a . . . outer circumferential face, 41t teeth, 43 . . . gear roll, 43a . . . outer circumferential face, 43t . . . teeth, 44 . . . heating element, 45 . . . ascending and descending mechanism, 46 . . . rotational driving mechanism, 47 . . . motor, 48 . . . pinion stand, 48a . . . gear, 48b . . . gear, 49a . . . spindle, 49b . . . spindle, 51 . . . belt conveyor, 52 . . . flat belt (belt), 53a . . . driving roller, 53b driven roller, 54 . . . suction box, 56 . . . guide roller, 56b . . . pressing roller, 57 . . . guide roller, 58 . . . guide roller, 59 . . . guide roller, 61 . . . rolling-up reel device, S1 . . . rolling-out section, S2 . . . heating section, S3 . . . preliminary drawing section, S4 . . . gear drawing section, S5 . . . cooling section, S6 . . . rolling-up section, P . . . pitch, R . . . range, P0 . . . origin, P1 . . . inflection point, V1 . . . reference velocity, V2 . . . circumferential velocity, V3 . . . circumferential velocity, V4 . . . circumferential velocity, V5 . . . circumferential velocity, V56 . . . circumferential velocity, V59 . . . circumferential velocity, C21 . . . rotational axis, C41 . . . rotational axis, C43 . . . rotational axis, C53a . . . rotational axis, C53b . . . rotational axis, Pin . . . position, Pout . . . position

BEST MODE FOR CARRYING OUT THE INVENTION

At least the following matters will be made clear by the description of the present specification with reference to the accompanying drawings.

A method for producing a stretchable sheet from a nonwoven fabric containing a plurality of types of fibers, the nonwoven fabric having a longitudinal direction, a width direction and a thickness direction, the method including:

a first drawing step of drawing the nonwoven fabric in the longitudinal direction by applying a tension in the longitudinal direction, and a second drawing step of drawing, in the longitudinal direction, the nonwoven fabric that has been drawn in the first drawing step with a plurality of teeth formed on an outer circumferential face of each of a pair of gear rolls, the drawing being performed by passing the nonwoven fabric through a gap between the gear rolls that rotate while the plurality of teeth being engaged with one another.

With such a method for producing a stretchable sheet, the nonwoven fabric that has been drawn in the first drawing step is further drawn with the teeth of the pair of gear rolls, and therefore a larger drawing amount can be given to the nonwoven fabric than drawing the nonwoven fabric with only the pair of gear rolls. Accordingly, it becomes possible to produce a stretchable sheet that expresses a large stretch amount.

In such a method for producing a stretchable sheet, it is preferable that a roller that drivingly rotates while contacting the nonwoven fabric is provided on a further upstream side in the longitudinal direction than the pair of gear rolls, and in the first drawing step the nonwoven fabric is drawn in the longitudinal direction by setting a circumferential velocity of the pair of gear rolls higher than a circumferential velocity of the roller.

With such a method for producing a stretchable sheet, since the circumferential velocity of the pair of gear rolls is set higher than the circumferential velocity of the roller, the nonwoven fabric can be reliably drawn in the longitudinal direction.

In such a method for producing a stretchable sheet, it is preferable that at least one type of fiber of the plurality of types of fibers is a stretchable fiber, and at least one type of fiber of the plurality of types of fibers is an extensible fiber that undergoes plastic deformation with an elongation smaller than the elongation at the elastic limit of the stretchable fiber.

With such a method for producing a stretchable sheet, since the nonwoven fabric contains the stretchable fiber, stretchability is granted to the stretchable sheet based on such stretchable fiber.

In such a method for producing a stretchable sheet, it is preferable that the extensible fiber is a thermoplastic polyolefin fiber, and in the first drawing step, the tension is applied to the nonwoven fabric that has been heated by a heater.

With such a method for producing a stretchable sheet, in the first drawing step the tension is applied to the nonwoven fabric and the nonwoven fabric is drawn. At that time, the nonwoven fabric is in a condition being heated by a heater, and also the extensible fiber contained in the nonwoven fabric is a thermoplastic polyolefin fiber. Therefore, the thermoplastic polyolefin fiber becomes likely to undergo plastic deformation, and becomes less likely to break during drawing. As a result, unintended breakage of the nonwoven fabric due to application of the tension can be effectively prevented.

In such a method for producing a stretchable sheet, it is preferable that the stretchable fiber is a thermoplastic elastomer fiber having a higher melting point than the thermoplastic polyolefin fiber.

With such a method for producing a stretchable sheet, even if the nonwoven fabric in a heated state is drawn in the first drawing step, stretchability is reliably granted to the stretchable sheet based on such stretchable fiber. A detailed description is provided below. Since the stretchable fiber contributes to expression of stretchability after drawing, it is preferable that the plastic deformation is smaller in the stretchable fiber for the expression of stretchability. In this respect, as mentioned above, the stretchable fiber is a thermoplastic elastomer fiber which has a higher melting point than the thermoplastic polyolefin fiber. Therefore, even when the extensible fiber is heated to a temperature region in which the extensible fiber can be drawn regarding the first drawing step, the stretchable fiber is generally less likely to readily undergo the plastic deformation. As a result, the plastic deformation of the stretchable fiber is suppressed and stretchability is reliably granted to the stretchable sheet.

In such a method for producing a stretchable sheet, it is preferable that the pair of gear rolls involved in the second drawing step include a heater for heating the nonwoven fabric.

With such a method for producing a stretchable sheet, in the second drawing step the nonwoven fabric is drawn by the pair of gear rolls in a state of being heated by a heater provided in the pair of gear rolls. Therefore, due to this heating, the extensible fiber that is the thermoplastic polyolefin fiber becomes likely to undergo the plastic deformation, and becomes less likely to break during drawing. Thereby, unintended breakage of the nonwoven fabric during drawing by the pair of gear rolls can be effectively prevented.

In such a method for producing a stretchable sheet, it is preferable to include a cooling step of cooling the nonwoven fabric that has been drawn in the second drawing step.

With such a method for producing a stretchable sheet, since the nonwoven fabric is promptly cooled after drawing in the second drawing step, the plastic deformation of the stretchable fiber after drawing can be effectively suppressed, and as a result, stretchability is reliably granted to the stretchable sheet.

In such a method for producing a stretchable sheet, it is preferable that in the cooling step the tension of the nonwoven fabric is decreased from the tension granted in the first drawing step.

With such a method for producing a stretchable sheet, since the tension of the nonwoven fabric is decreased in the cooling step, the plastic deformation of the stretchable fiber after drawing can be further effectively suppressed, and as a result, stretchability is granted to the stretchable sheet more reliably.

In such a method for producing a stretchable sheet, it is preferable that in the cooling step the nonwoven fabric is sucked by a belt with a plurality of suction holes formed thereon that moves in a predetermined direction, and is transported in the predetermined direction, and the nonwoven fabric is cooled by the air sucked through the suction holes while being transported by the belt.

With such a method for producing a stretchable sheet, the nonwoven fabric is transported while being sucked by the belt, and therefore it is not necessary to apply a large tension to the nonwoven fabric for stable transportation. Accordingly, it is possible to reduce the tension that acts on the nonwoven fabric in the cooling step to approximately zero. Thus, the plastic deformation of the stretchable fiber after drawing can be further effectively suppressed, and as a result stretchability is granted to the stretchable sheet more reliably.

Also, since the nonwoven fabric is cooled with the air for sucking the nonwoven fabric to the belt, there is no need to provide another cooling device and the configuration of the apparatus can be simplified.

===Method for Manufacturing Stretchable Sheet 3*a* of the Present Embodiment===

<<Abbreviated Explanation of "Drawing Processing" Regarding the Method of Producing Stretchable Sheet 3*a*>>

First, an abbreviated explanation of the "drawing processing" regarding the method of producing the stretchable sheet 3*a* is given.

The nonwoven fabric 3 used as a material for the stretchable sheet 3*a* is a comingled-type nonwoven fabric 3 which is produced by blending an extensible fiber and a stretchable fiber by melt spinning or the like. Here, the "extensible fiber" means a fiber that undergoes plastic deformation with an elongation smaller than the elongation at the elastic limit of the stretchable fiber. In other words, it can be said that the extensible fiber is a fiber that can substantially non-elastically-extend and the stretchable fiber is a fiber that can elastically-extend.

However, in the production method according to the present embodiment, since the nonwoven fabric 3 is heated during the drawing processing as described below, a thermoplastic polyolefin fiber is used as the extensible fiber, while a thermoplastic elastomer fiber which has a higher melting point than the thermoplastic polyolefin fiber is used as the stretchable fiber.

Examples of the former thermoplastic polyolefin fiber include a single fiber such as polypropylene fiber or polyester fiber, and a conjugate fiber with a sheath core structure consists of polypropylene or polyester. However, in here, the single polypropylene fiber (hereinafter referred to as a "PP fiber") is used.

Also, examples of the latter thermoplastic elastomer fiber include a polyurethane fiber. In here, the polyurethane fiber is used. These PP fiber and polyurethane fiber are blended at, for example, a weight ratio of 50:50.

The methods for producing the nonwoven fabric 3 include a spunbonding method (a method in which fibers are joined to one another by self-bonding through direct spinning), or a chemical-bonding method (a method in which fibers are joined through bonding one another with an adhesive resin applied thereto). However, in here, the spunbonding method is being used. Also, the basis weight or fiber diameter of the nonwoven fabric 3 is determined depending on the required specifications of the stretchable sheet 3*a*, however, in here, since the stretchable sheet 3*a* is used for a fastening member of the disposable diaper 1 to be fastened around the torso, the basis weight is set to 35 ($g/m^2$) and the fiber diameter of the PP fiber and polyurethane fiber is set to 10 to 30 (μm).

And, by performing the drawing processing on such nonwoven fabric 3, stretchability is expressed in the nonwoven fabric 3 so as to become the stretchable sheet 3*a*.

Figure 4A:
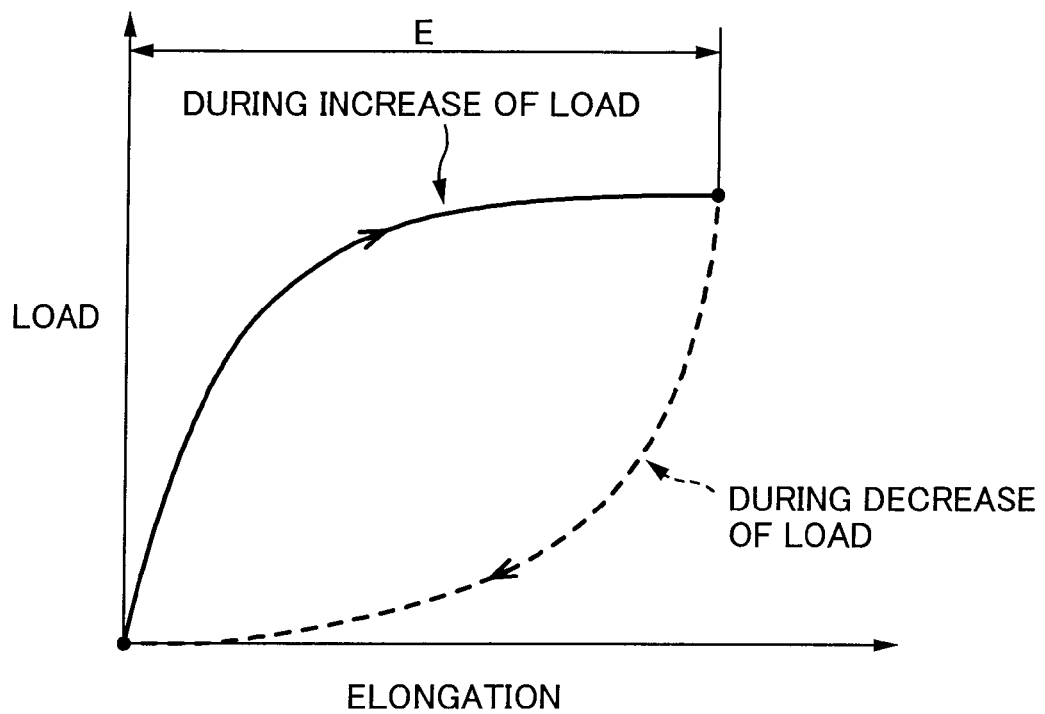
FIGS. 4A and 4B are explanatory diagrams of a mechanism in which stretchability is expressed due to a drawing processing, and show a load-elongation curve of the nonwoven fabric 3.
Figure 4B:
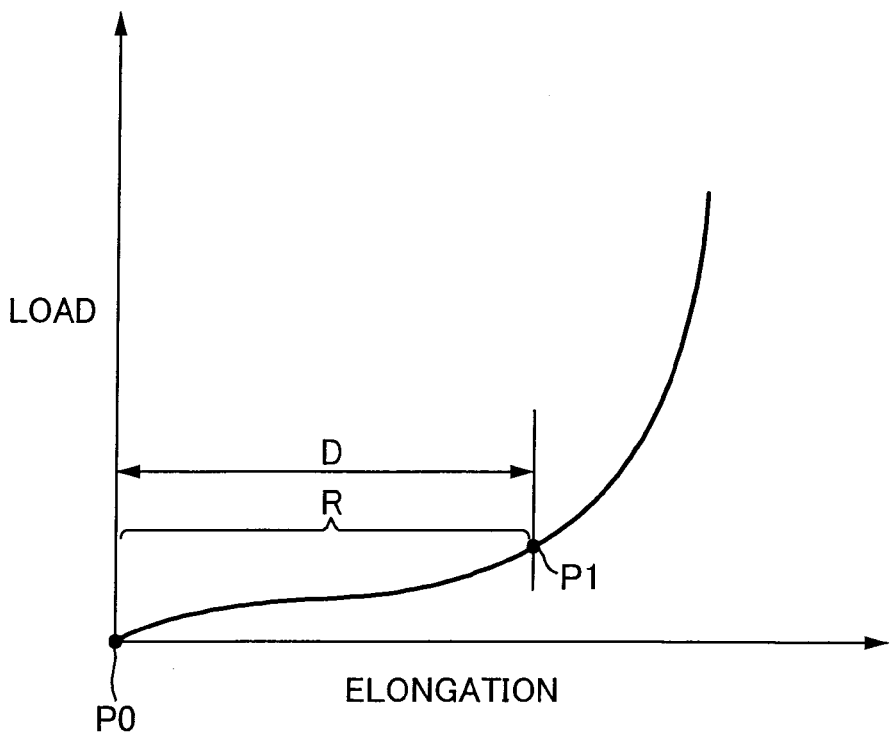

FIGS. 4A and 4B are explanatory diagrams of a mechanism in which the stretchability is expressed in the drawing processing, and each diagram shows the load-elongation curve of the nonwoven fabric 3.

When a tension (hereinafter also referred to as a "load") is applied to the nonwoven fabric 3 within the elastic limit of the polyurethane fiber, which is the stretchable fiber, in order to perform the drawing processing on an undrawn nonwoven fabric 3, the load-elongation curve as shown in FIG. 4A is obtained during such drawing processing. Specifically, the obtained load-elongation curve includes a hysteresis in which the load under the same elongation is lower when the tension is being released than when the tension is being applied.

And, in the case where the tension is applied again after the drawing processing, the load-elongation curve as shown in FIG. 4B will be drawn. Further described, the nonwoven fabric 3 stretches at a significantly low elastic modulus from the origin P0 to an inflection point P1 in FIG. 4B. However, the load rapidly increases in a substantially quadric curve form, once the elongation exceeds the inflection point P1. And normally, by the expression of this low elastic modulus range R, the stretchability is considered to have been developed in the nonwoven fabric 3 by the drawing processing. And an elongation amount D from the origin P0 in an unloaded state to the inflection point P1 is defined as a "developed stretch amount D".

Incidentally, the reason of the nonwoven fabric 3 stretching at a significantly low elastic modulus from the origin P0 to the inflection point P1 after the drawing processing can be explained as below.

Figure 5A:
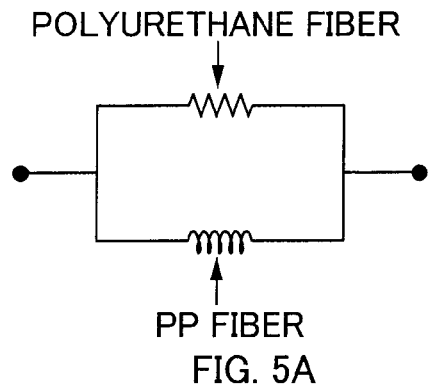
FIG. 5A is a schematic view showing a state of fiber before the drawing processing (i.e., an undrawn state).
Figure 5B:
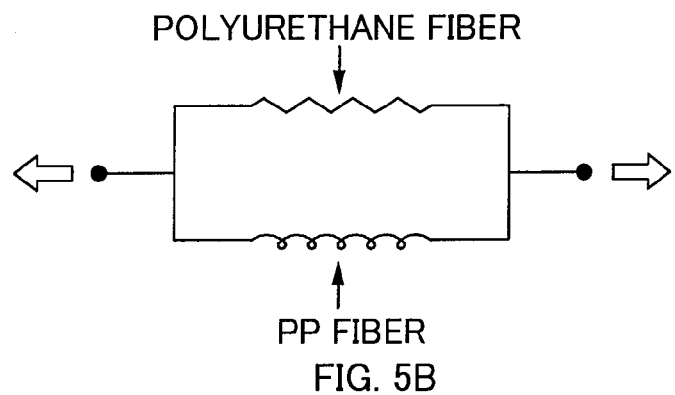
FIG. 5B is a schematic view showing a state of fiber during the drawing processing (i.e., during loading).
Figure 5C:
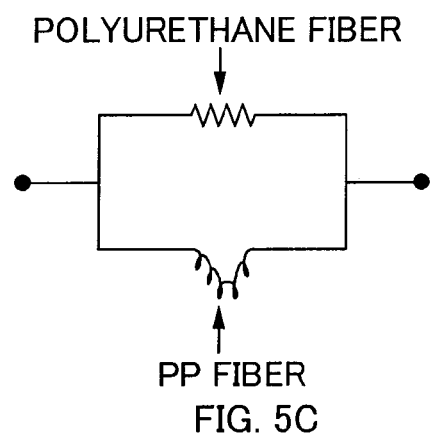
FIG. 5C is a schematic view showing a state of fiber after the drawing processing (i.e., after unloading).

FIG. 5A is a schematic view showing a state of fiber before the drawing processing (i.e., an undrawn state). FIG. 5B is a schematic view showing a state of fiber during the drawing processing (i.e., during loading). FIG. 5C is a schematic view showing a state of fiber after the drawing processing (i.e., after unloading). Note that a general minimum unit structure constituting the nonwoven fabric 3 can be modeled as, the polyurethane fiber as the stretchable fiber and the PP fiber as the extensible fiber being connected in parallel, as shown in FIG. 5A.

In the case where the undrawn nonwoven fabric 3 shown in FIG. 5A is drawn, the polyurethane fiber, which is the stretchable fiber, undergoes elastic deformation. However, as shown in FIG. 5B, the PP fiber, which is the extensible fiber whose elongation at the elastic limit is smaller than that of the stretchable fiber, undergoes plastic deformation at a comparatively early stage and the PP fiber is elongated by plastic deformation. Accordingly, when the tension is released in this state, as shown in FIG. 5C, the polyurethane fiber simply ceases to be elastically elongated, in other words, the total length thereof returns to substantially the same length before applying the tension. However, the total length of the PP fiber is elongated by the amount of the plastic elongation and the PP fiber becomes slack.

Figure 5D:
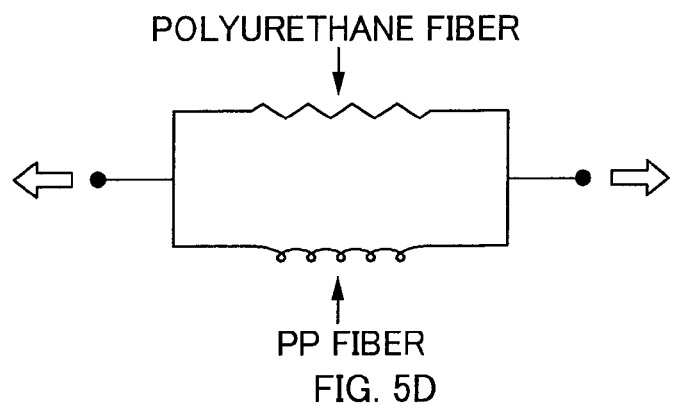
FIG. 5D is a schematic view showing a state of fiber when the nonwoven fabric 3 is drawn again after the drawing processing.

And, if the tension is applied again to the nonwoven fabric 3 that has undergone the drawing processing, the nonwoven fabric 3 resists the above tension only by the elastic deformation of the polyurethane fiber until the slack portion of the PP fiber is fully extended so as to be stretched over the entire length thereof. Therefore, as shown in FIG. 4B, the nonwoven fabric 3 is extended at a significantly low elastic modulus. However, as shown in FIG. 5D, from the point at which the above-mentioned slack in the PP fiber is gone and the PP fiber is stretched over the entire length thereof, the elastic-plastic deformation of the PP fiber also starts to resist the tension. Accordingly, the tension required to extend the nonwoven fabric 3 rapidly increases from that point. That is, the point at which the slack in the PP fiber disappears is the inflection point P1 in FIG. 4B, and based on the descriptions given so far, as shown in FIG. 4B, the load-elongation curve after the drawing processing is such that the nonwoven fabric 3 is stretched at an extremely low elastic modulus until the inflection point P1, and the load rapidly increases after exceeding the inflection point P1. Incidentally, it goes without saying that when the tension is released within the range R from the origin P0 to the inflection point P1, namely, within the range R of the "developed stretch amount D", the load-elongation curve substantially tracks back along the load-elongation curve during loading shown in FIG. 4B, and returns to the origin P0.

Incidentally, in the definition of the aforementioned "developed stretch amount D", the "developed stretch amount D" was defined as the elongation amount D from the origin P0 to the inflection point P1. However, based on the above description, the position of the inflection point P1 moves farther from the origin P0 as the slack in the PP fiber after the drawing processing gets larger. Therefore, the larger is the slack in the PP fiber, the larger is the "developed stretch amount D". Furthermore, a drawing amount E (see FIG. 4A) in the drawing processing needs to be increased in order to increase the slack in the PP fiber. Consequently, in order to increase the stretch amount D developed in the stretchable sheet 3a, it is important to grant a large drawing amount E to the nonwoven fabric 3 in the drawing processing.

<<Method for Manufacturing Stretchable Sheet 3a>>

Figure 6:
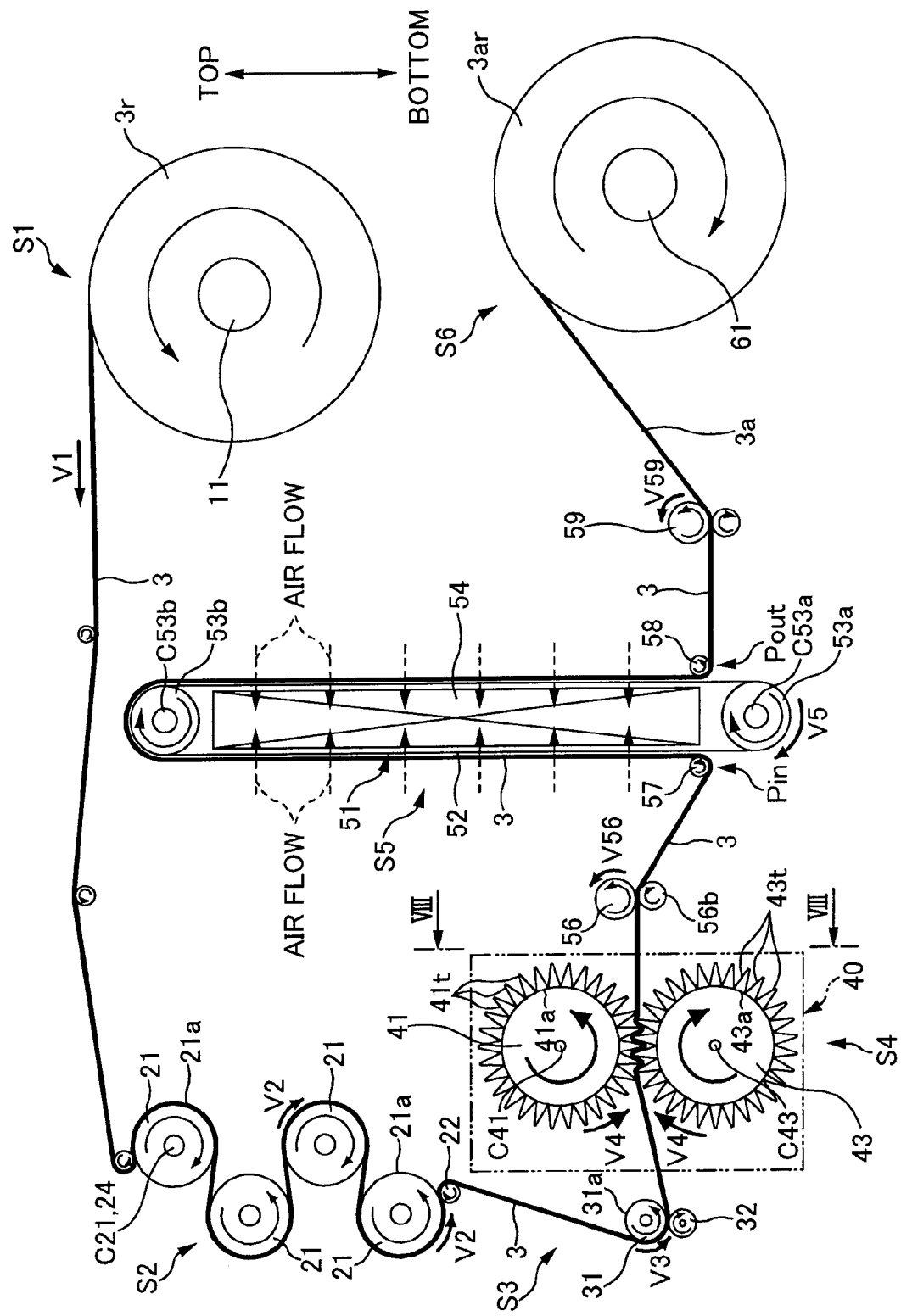
FIG. 6 is a layout of a production line of a stretchable sheet 3a, and shows the production line seen from the side.

FIG. 6 is a layout of a production line of the stretchable sheet 3a, and shows the production line as viewed from the side face. This production line implements a continuous production method, in which the nonwoven fabric 3 as a material is processed into a continuous-sheet form that continues in the flow direction of the production line, so as to continuously produce the stretchable sheet 3a, and includes six sections from S1 to S6.

Specifically, (1) a rolling-out section 51 in which the nonwoven fabric 3 is delivered in the continuous-sheet form along the flow direction of the production line after rolling out from a nonwoven fabric roll 3r (the nonwoven fabric 3 as a material rolled up in a roll form), (2) a heating section S2 in which the delivered nonwoven fabric 3 is heated while being moved in the flow direction, (3) a preliminary drawing section S3 (this corresponds to a section that carries out a "first drawing step" in the CLAIMS) in which the tension is applied in the flow direction to the nonwoven fabric 3 that has been heated to raise its temperature, and the nonwoven fabric 3 is drawn preliminarily, (4) a gear drawing section S4 (this corresponds to a section that carries out a "second drawing step" in the CLAIMS) in which the preliminarily-drawn nonwoven fabric 3 is further drawn in the flow direction by the gear rolls 41 and 43, (5) a cooling section S5 (this corresponds to a section that carries out a "cooling step" in the CLAIMS) in which the nonwoven fabric 3 drawn by the gear rolls 41 and 43 is cooled, and (6) a rolling-up section S6 in which the stretchable sheet 3a, which is the cooled nonwoven fabric 3, is rolled up in a roll form.

And, with such production method, the nonwoven fabric 3 is preliminarily drawn with the tension applied in the preliminary drawing section S3 prior to the drawing processing in the gear drawing section S4. In other words, the nonwoven fabric 3 that has been drawn by a predetermined drawing amount in the preliminary drawing section S3 is further drawn by the gear rolls 41 and 43 from such drawn state. Therefore, it becomes possible to give the nonwoven fabric 3 a drawing amount that is larger than the drawing amount given only by the gear rolls 41 and 43 in the gear drawing section S4, by an amount of the preliminary drawing. As a result, it becomes possible to produce the stretchable sheet 3a that expresses a large stretch amount.

Each of the sections 51 to S6 are described below. Note that the flow direction of the production line is the same as the longitudinal direction of the nonwoven fabric 3 in the continuous-sheet form. Also, the width direction of the nonwoven fabric 3 orthogonal to the longitudinal direction of the nonwoven fabric 3 (direction penetrating the sheet face in FIG. 6) is simply referred to as a "width direction".

(1) Rolling-Out Section S1

The rolling-out section S1 is provided with a rolling-out reel device 11. The nonwoven-fabric roll 3r is attached to this rolling-out reel device 11 and the nonwoven fabric 3 is rolled out, and the rolled out nonwoven fabric 3 is delivered in the continuous-sheet form to the heating section S2 on the downstream side in the flow direction, setting a predetermined reference velocity V1 as the target velocity of transportation.

(2) Heating Section S2

Four heating rollers 21 (corresponding to a "roller" and a "heater" in the CLAIMS) are disposed as heaters for heating the nonwoven fabric 3 in the heating section S2. The nonwoven fabric 3 is sequentially forwarded in the continuous sheet form from the heating roller 21 on the upstream side in the flow direction to the heating roller 21 on the downstream side in the flow direction, while being sequentially wrapped in an S-shape on a flat outer circumferential face 21a of each heating roller 21. While the nonwoven fabric 3 contacts the outer circumferential faces 21a of these heating rollers 21, the nonwoven fabric 3 is heated at each outer circumferential face 21a. Note that the nonwoven fabric 3 is heated at this stage in order to prevent breakage of the nonwoven fabric 3 in the next preliminary drawing section S3, which is described later.

The four heating rollers 21 disposed from the upstream side to the downstream side in the flow direction are smooth rolls with a steel cylindrical body having the same structure. Each heating roller 21 has the orientation of a rotational axis C21 aligned with the width direction, and each drivingly rotates at the same circumferential velocity V2. Driving torque for each heating roller 21 is distributed and supplied from a driving power source, for example, a single motor (not shown). That is, the driving torque is inputted to each of the four heating rollers 21 via an appropriate endless-belt power transport unit or the like (not shown) provided with a pulley joined to the motor, and an endless belt extended around this pulley or the like. Also the circumferential velocity V2 of the heating roller 21 is controlled so as to be substantially the same velocity as the above-described reference velocity V1. Accordingly, in the heating section S2, a condition is maintained in which the tension applied to the nonwoven fabric 3 is kept as small as possible in a range in which the nonwoven fabric 3 does not slack.

Inside each heating roller 21, a heating element 24 for heating the outer circumferential face 21a thereof is embedded. The temperature at the outer circumferential face 21a is adjusted by adjusting the heating value of the heating element 24. While the target temperature of the outer circumferential face 21a is determined depending on fibers constituting the nonwoven fabric 3, basically, the target temperature is set based on the melting point of the thermoplastic polyolefin fiber, which has the lower melting point, to an appropriate temperature that is equal to or lower than such melting point. In here, since the thermoplastic polyolefin fiber is the PP fiber, the target temperature of the outer surface 21a is set to, for example, 80 degrees. The embedding position of the heating element 24 is set in a point-symmetric manner with respect to the rotational axis C21 so that the outer circumferential face 21a of the heating roller 21 is evenly heated over the entire circumference thereof. In here, a single through-hole for inserting the substantially bar-shaped heating element 24 along the rotational axis direction, with the center of the through-hole matching with the rotational axis C21, is formed in each heating roller 21.

And, the nonwoven fabric 3 heated in the heating section S2 as described above is delivered to the preliminary drawing section S3 that is on the downstream side in the flow direction by the heating roller 21 that rotates at the circumferential velocity V2.

(3) Preliminary Drawing Section S3

In the preliminary drawing section S3, the tension in the flow direction is applied to the nonwoven fabric 3 that has been heated in the heating section S2 so as to preliminarily draw the nonwoven fabric 3. Hereinafter, this preliminary drawing is referred to as "preliminary drawing".

This preliminary drawing is performed through setting the circumferential velocity V2 of the heating roller 21 disposed on the most downstream side of the heating section S2, and a circumferential velocity V4 of the gear rolls 41 and 43 of the gear drawing section S4 that is described later. Specifically, in order to grant the tension for the preliminary drawing to the nonwoven fabric 3, the target velocity of the circumferential velocity V4 of the gear rolls 41 and 43 is set higher than the target velocity of the circumferential velocity V2 of the heating roller 21 by an amount corresponding to a draw ratio Mp described below. For example, the target velocity of the circumferential velocity V4 is set to Mp times the target velocity of the circumferential velocity V2.

Note that in the present embodiment, a guide roller 31 for guiding the nonwoven fabric 3 to a space between the gear rolls 41 and 43 is disposed between the most downstream heating roller 21 and the gear rolls 41 and 43. As a result of the nonwoven fabric 3 being wrapped around the guide roller 31 at a predetermined wrapping angle, the flow direction of the nonwoven fabric 3 is directed to the direction of the space between the gear rolls 41 and 43.

Here, as a parameter other than the drawing amount that indicates to what extent the nonwoven fabric 3 is drawn, a new parameter called draw ratio M is introduced. This draw ratio M indicates the number of times by which a total length La of the nonwoven fabric 3 after drawing is multiplied compared to a total length Lb of the nonwoven fabric 3 before drawing, and is defined by Expression 1 below.

Draw Ratio $M$=Total length $La$ in the flow direction after drawing/Total length $Lb$ in the flow direction before drawing  Expression 1

And in the preliminary drawing section S3, the nonwoven fabric 3 is drawn in the flow direction at the draw ratio Mp of 1.1 to 1.8 times for example, based on the difference in the circumferential velocities $\Delta V$ (=V4−V2) between the stated heating roller 21 and the gear rolls 41 and 43. However, there is no limitation to this, and the draw ratio Mp may be changed depending on other conditions.

Further, if the draw ratio Mp is increased, the tension that acts on the nonwoven fabric 3 increases and the nonwoven fabric 3 may break. However, in this respect, in the present embodiment the nonwoven fabric 3 is heated in advance in the above-described heating section S2 so as to increase the temperature thereof. Also, the nonwoven fabric 3 contains the PP fiber, and such PP fiber is thermoplastic. Therefore, the thermoplastic PP fiber readily undergoes plastic deformation because of the above heating and becomes less likely to break during drawing. As a result, breakage of the nonwoven fabric 3 caused by application of the tension is prevented.

Also, it is preferable to provide a pressing roller 22 to the most downstream heating roller 21, which drivenly rotates while sandwiching the nonwoven fabric 3 with this heating roller 21, as shown in FIG. 6. And, in this manner, the nonwoven fabric 3 is pressed against the outer circumferential face 21a of the heating roller 21 with the pressing roller 22, and thus the relative slippage between the heating roller 21 and the nonwoven fabric 3 in the flow direction can be reliably suppressed, and consequently, the nonwoven fabric 3 can be reliably drawn at the target draw ratio Mp by setting the difference in the circumferential velocities $\Delta V$ between the heating roller 21 and the gear rolls 41 and 43.

Also, the guide roller 31 shown in FIG. 6 may be a driven roller that rotates in a driven manner, or a driving roller that drivingly rotates with a motor or the like. However, in the case of the latter driving roller, the target velocity of a circumferential velocity V3 is set to a velocity between the target velocity of the circumferential velocity V2 of the heating roller 21 and the target velocity of the circumferential velocity V4 of the gear rolls 41 and 43. Also, in the case of the driving roller, it is preferable to provide a pressing roller 32 that rotates in a driven manner while sandwiching the nonwoven fabric 3 with the guide roller 31, as shown in FIG. 6. And, in this manner, the nonwoven fabric 3 is pressed against an outer circumferential face 31a of the guide roller 31 with the pressing roller 32, and therefore the relative slippage between the guide roller 31 and the nonwoven fabric 3 in the flow direction can be reliably suppressed, and consequently, the nonwoven fabric 3 can be reliably drawn due to at least the difference in the circumferential velocities between the heating roller 21 and the guide roller 31.

(4) Gear Drawing Section S4

In the gear drawing section S4, in addition to the drawing amount drawn in the stated preliminary drawing section S3, the nonwoven fabric 3 is further drawn in the flow direction with the gear rolls 41 and 43. That is, the nonwoven fabric 3 that has been drawn at the draw ratio Mp in the preliminary drawing section S3 is further drawn at a draw ratio Mg of the gear drawing section S4. Therefore, after the nonwoven fabric 3 undergoes this series of drawing in the preliminary drawing section S3 and in the gear drawing section S4, the total draw ratio Mt of the nonwoven fabric 3 becomes Mt=Mp×Mg. As a result, the drawing amount is increased by Mp times compared to the draw ratio Mg in the case where there is only the gear drawing section S4. Note that, hereinafter, this drawing of the nonwoven fabric 3 with the gear rolls 41 and 43 is referred to as "gear drawing".

Figure 2:
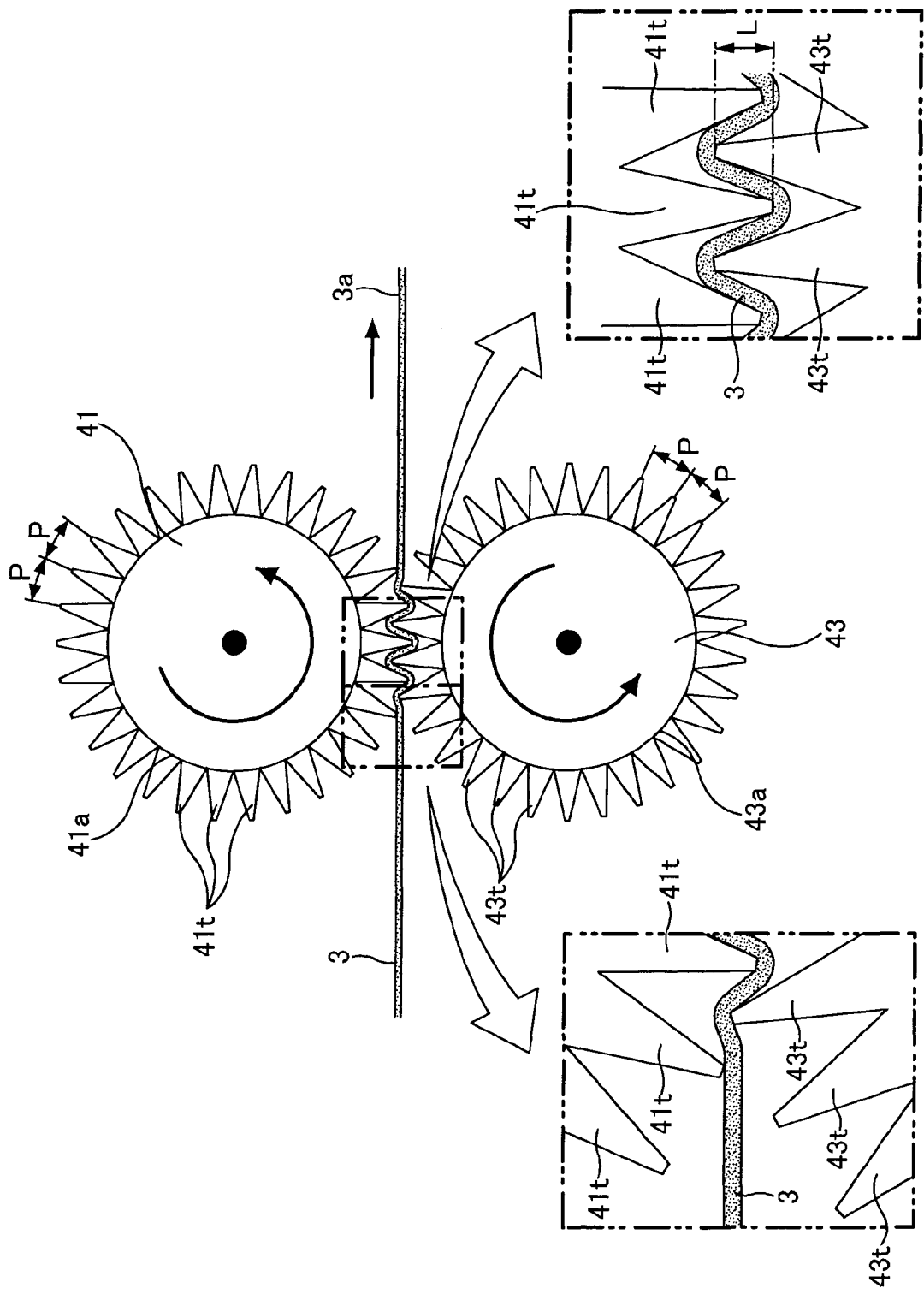
FIG. 2 is a side view for describing gear drawing, with a part of which is being enlarged.
Figure 3A:
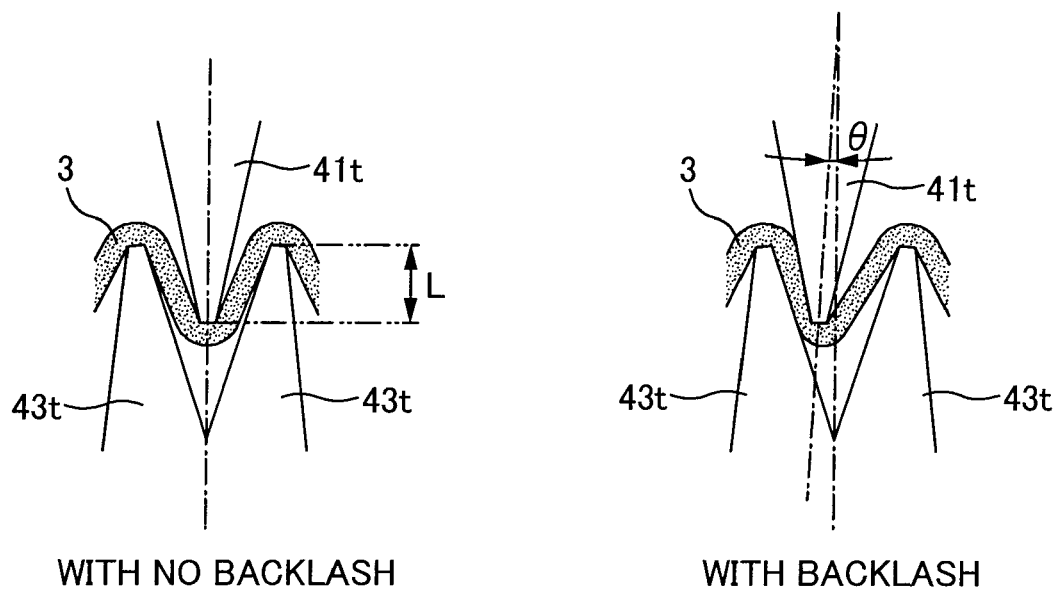
FIGS. 3A and 3B are explanatory diagrams of the relationship between an engagement depth L of teeth 41t and 43t and a drawing amount of a nonwoven fabric 3.
Figure 3B:
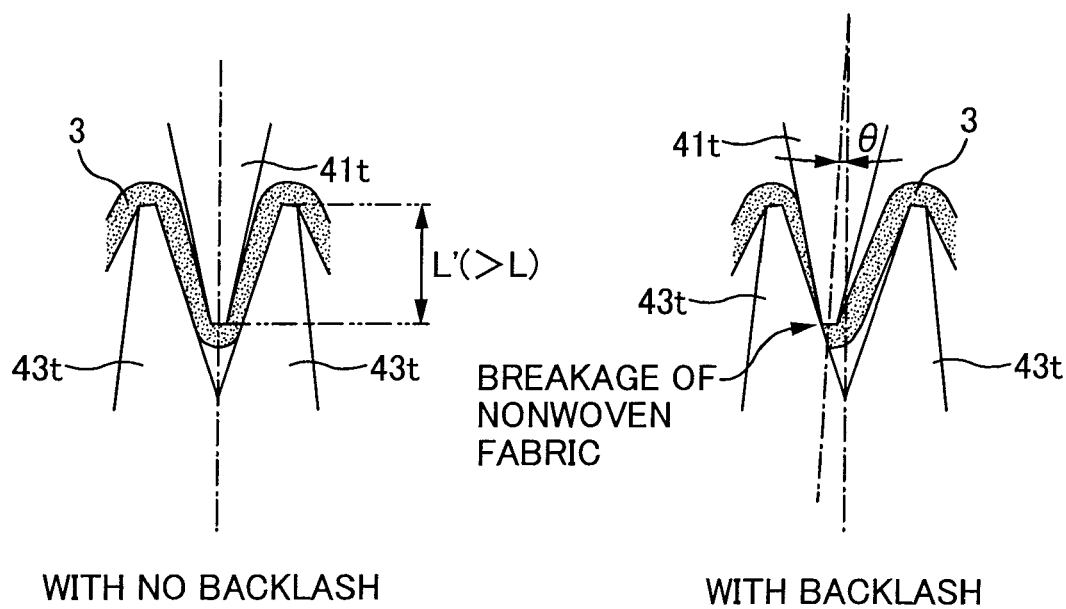

Here, the gear drawing is described with reference to FIG. 2. The gear drawing is performed using a pair of upper and lower gear rolls 41 and 43, in which teeth (teeth having the same shape as the teeth of so-called "spur gear") are formed in a wave form in the circumferential direction at a predetermined formation pitch P on outer circumferential faces 41a and 43a thereof. That is, the "gear drawing" is a method in which the nonwoven fabric 3 is passed through the space between the gear rolls 41 and 43, while the nonwoven fabric 3 is deformed by being bended at three points by the teeth 41t of the upper gear roll 41 and the teeth 43t of the lower gear roll 43 that engage with one another (see the right enlarged view in FIG. 2) so as to be drawn in the flow direction.

Figure 7A:
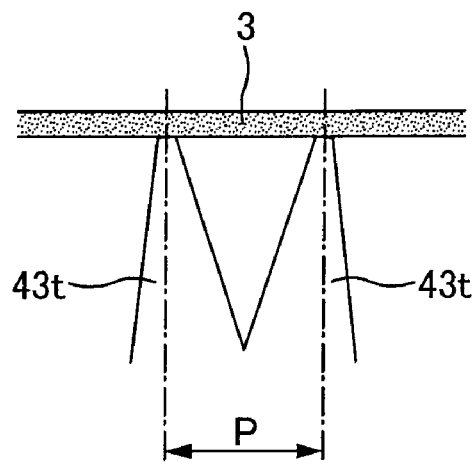
FIGS. 7A and 7B are explanatory diagrams of the calculation formula of a draw ratio Mg in the gear drawing.
Figure 7B:
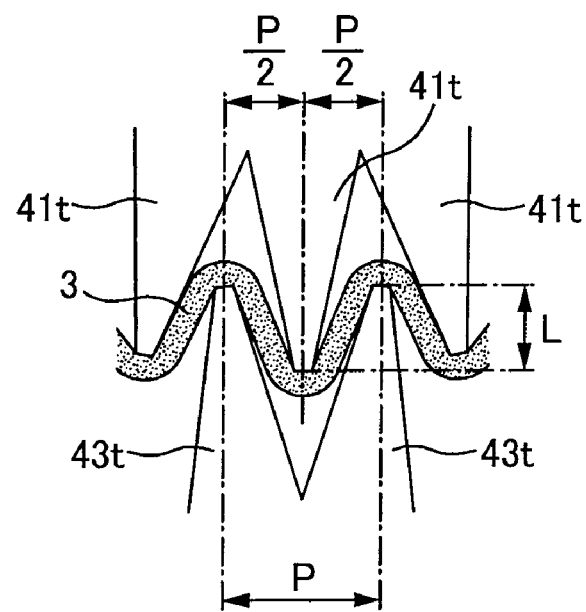

And, in the case where the nonwoven fabric 3 is passed through the space between the rolls, the nonwoven fabric in which the original total length before the gear drawing is P in FIG. 7A is drawn by being deformed by being bent at three points by the teeth 41t and 43t that engage with one another as shown in FIG. 7B. Accordingly, when the geometric relationship of these changes in the state is taken into account, the draw ratio Mg of the nonwoven fabric 3 due to the gear drawing can be approximately expressed as a function of the formation pitch P of the teeth 41t (43t) and the engagement depth L of the teeth 41t and the teeth 43t, as in Expression 2 below.

$$Mg = 2 \times \sqrt{(L^2 + (P/2)^2)}/P \quad \text{Expression 2}$$

Figure 8:
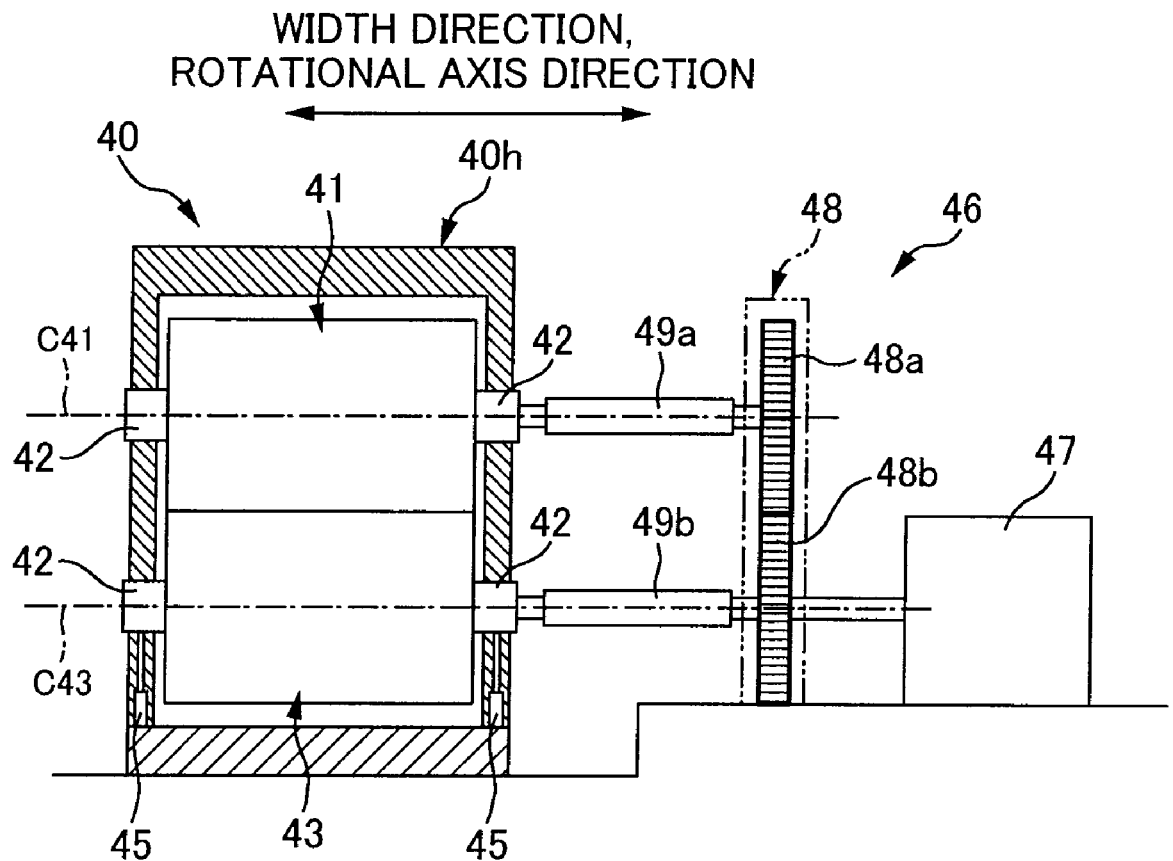
FIG. 8 is a front view of a gear drawing device 40.

A gear drawing device 40 as shown in FIG. 8 is arranged in the gear drawing section S4 in order to perform such gear drawing. FIG. 8 is a front view of the gear drawing device 40 (i.e., the figure described by viewing along arrows VIII-VIII in FIG. 6).

The gear drawing device 40 includes a pair of the upper and lower gear rolls 41 and 43 having the respective rotational axes C41 and C43 thereof that are arranged parallel to the width direction, that rotate while the respective outer circumferential faces 41a and 43a thereof are opposing to each other, and a rotational drive mechanism 46 for rotating the gear rolls 41 and 43 around the rotational axes C41 and C43.

The upper and lower gear rolls 41 and 43 are steel cylindrical bodies having the same diameter, each being supported by a housing 40h of the gear drawing device 40 via bearings 42 at the both end portions thereof in the rotational axis direction, so as to be rotatable around the rotational axis. Note that in this example, while the upper gear roll 41 is supported by the housing 40h so as to be incapable of ascending and descending, the lower gear roll 43 is supported by an ascending and descending mechanism 45 such as a hydraulic cylinder for example, so as to be capable of ascending and descending. Therefore, by the ascending and descending operation of the ascending and descending mechanism 45, the size of the space between the upper gear roll 41 and the lower gear roll 43 is adjusted so as to be a predetermined target value. That is, the engagement depth L between the teeth 41t of the upper gear roll 41 and the teeth 43t of the lower gear roll 43 is adjusted so as to be the predetermined target value. The target value of the engagement depth L is determined depending on the draw ratio Mg at the gear drawing.

Figure 9:
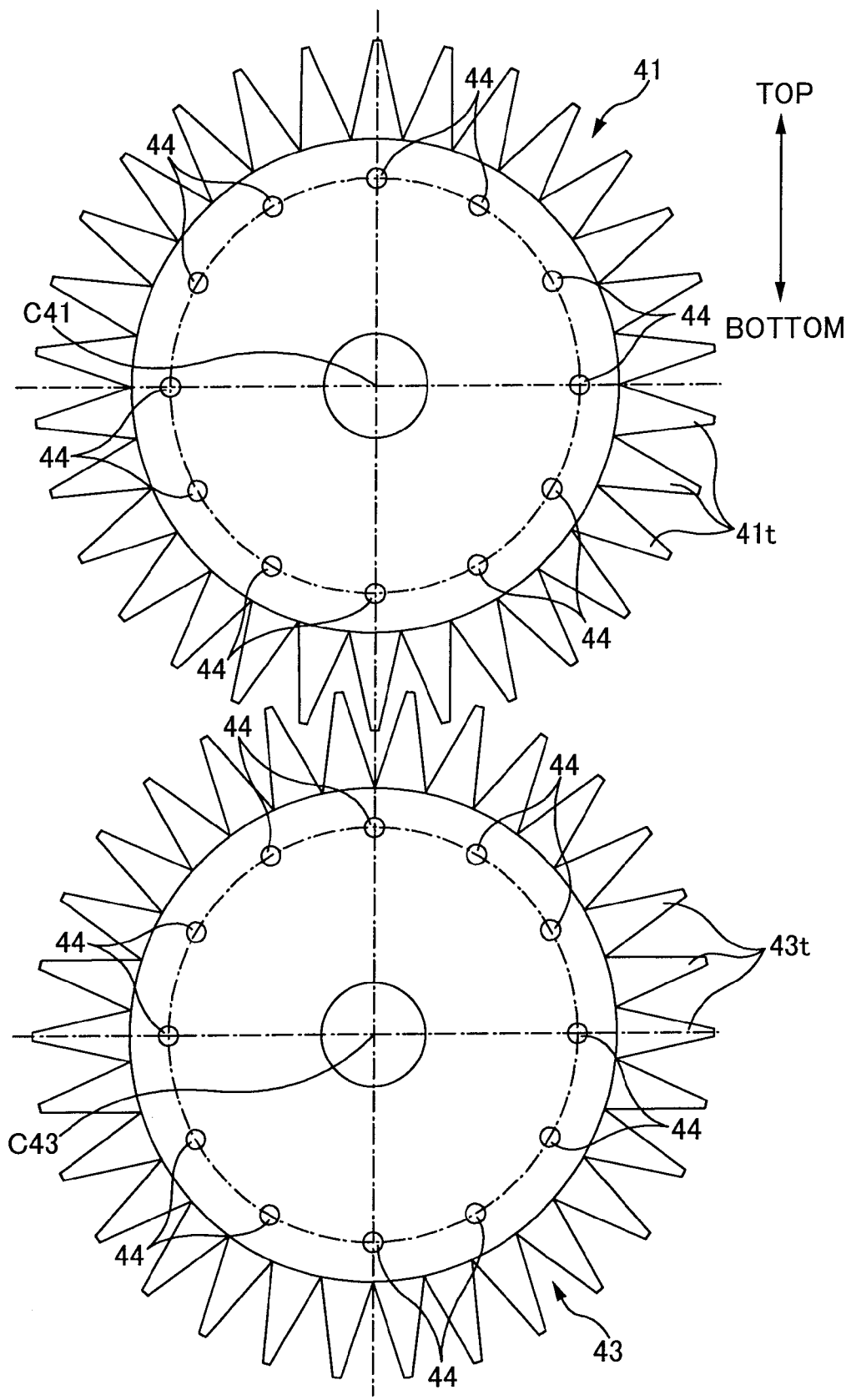
FIG. 9 is a side view for illustrating embedding positions of heating elements 44 for heating the teeth 41t and 43t of gear rolls 41 and 43.

As shown in a side view of FIG. 9, heating elements 44 for heating the gear rolls 41 and 43 are embedded inside each of the gear rolls 41 and 43, and the temperature of the teeth 41t and 43t of the outer circumferential faces 41a and 43a of the gear rolls 41 and 43 is adjusted by adjusting the heating value of the heating element 44. The target temperature of the teeth 41t and 43t is determined depending on the constituent fiber of the nonwoven fabric 3, and in here, the target temperature of the teeth 41t and 43t is set to 55 degrees for example. Note that the embedding positions of the heating elements 44 are disposed in a point-symmetric manner with respect to the rotational axes C41 and C43, such that the outer circumferential faces 41a and 43a of the gear rolls 41 and 43 are evenly heated over the entire circumference thereof. In here, through holes for inserting twelve substantially bar-shaped heating elements 44 along the rotational axis direction are each formed in twelve positions that equally divide the entire circumference of the gear rolls 41 and 43 into twelve in the circumferential direction, having equal distance from the outer circumferential faces 41a or 43a in the radial direction.

The rotational driving mechanism 46 includes, as shown in FIG. 8, a motor 47 that serves as a driving power source for the rotational operation of the upper and lower gear rolls 41 and 43, a pinion stand 48 for distributing the driving torque from the motor 47 to the upper and lower gear rolls 41 and 43, and a pair of upper and lower spindles 49a and 49b for transmitting the distributed driving torque to the upper and lower gear rolls 41 and 43. And, the driving torque of a single axis supplied from the motor 47 is distributed to the driving torque of two axes by a pair of gears 48a and 48b that engage with each other in the pinion stand 48, and the driving torque of these two axes is transmitted to the upper gear roll 41 and the lower gear roll 43 via the upper spindle 49a and the lower spindle 49b that are linked to the gears 48a and 48b respectively, and thereby each of the upper and lower gear rolls 41 and 43 rotates at the same circumferential velocity V4. Note that the "circumferential velocity V4" in here refers to a velocity at the teeth-top (distal end of the teeth 41t and 43t).

With such gear drawing device 40, as shown in FIG. 6, in the case where the nonwoven fabric 3 is passed through the space between the rotating upper and lower gear rolls 41 and 43, the nonwoven fabric 3 is drawn at the draw ratio Mg of 2.8 to 2.9 for example, with the teeth 41t and 43t of the outer circumferential faces 41a and 43a of the upper and lower gear rolls 41 and 43. And the nonwoven fabric 3 that has undergone the gear drawing is delivered in a continuous-sheet form to the cooling section S5 on the downstream side in the flow direction.

(5) Cooling Section S5

In the cooling section S5, as shown in FIG. 6, a plurality of guide rollers 56 and 57 for guiding the nonwoven fabric 3 drawn by the gear drawing device 40 to a cooling device 51 described below, the cooling device 51 for cooling the nonwoven fabric 3 while the nonwoven fabric 3 is being transported in a continuous-sheet form, and a plurality of guide rollers 58 and 59 for guiding the cooled nonwoven fabric 3 to the rolling-up section S6 are disposed. And this cooling device 51 promptly cools the nonwoven fabric 3 to proximity normal temperature, so that the plastic deformation of the stretchable fiber that contributes to expression of stretchability in the drawn nonwoven fabric 3, namely, polyurethane fiber, is effectively suppressed. As a result, stretchability is reliably granted to the stretchable sheet 3a as the nonwoven fabric 3 after the drawing processing.

In here, a suction-type belt conveyor 51 is used as the cooling device 51. This suction-type belt conveyor 51 has a configuration in which a flat belt 52 used for transportation (this corresponds to a "belt" in the CLAIMS) includes a plurality of suction holes (not shown) formed over the entire face thereof, these suction holes sucking air around the same, and the flat belt 52 is revolved while the nonwoven fabric 3 as the transporting object is being sucked toward the flat belt 52 with the suction force resulting form such sucking, thereby transporting the nonwoven fabric 3. Accordingly, air flow passing through the nonwoven fabric 3 in the thickness direction occurs to the nonwoven fabric 3 as a result of air being sucked from the suction holes at that time, thereby the nonwoven fabric 3 is effectively cooled.

Described in further detail, the belt conveyor 51 includes a pair of rollers 53a and 53b that are provided in two positions one by one in the flow direction, while rotational axes C53a and C53b are being oriented to the width direction, the endless flat belt 52 extended around the pair of rollers 53a and 53b, which revolves by the roller 53a, one of the rollers, that drivingly rotates, and a suction box 54 for sucking air through the suction holes on the flat belt 52, which is disposed inside the closed circular orbit of the flat belt 52. Note that the roller 53a, one of the pair of the rollers 53a and 53b, is a driving roller that drivingly rotates using a motor (not shown) as a driving power source, and the other roller 53b is a driven roller that rotates by being driven by the driving roller. Also, the internal space of the suction box 54 is maintained at a negative pressure with an appropriate blower device, thereby making it possible to intake air through the suction holes.

And, with such a configuration, the nonwoven fabric 3 guided to the vicinity of the driving roller 53a by the guide rollers 56 and 57 is sucked at a position Pin to the flat belt 52 and adheres to the flat belt 52. And from there the nonwoven fabric 3 moves nearly integral with the flat belt 52 to the driven roller 53b due to the circulating migration of the flat belt 52. However, the movement direction of the flat belt 52 is reversed at this driven roller 53b, so the nonwoven fabric 3 is similarly reversed. After that, the nonwoven fabric 3 is moved to the vicinity of the driving roller 53a. And at a position Pout the nonwoven fabric 3 is separated from the flat belt 52 by the guide roller 58, and is guided to the rolling-up section S6 on the downstream side.

Here, in the range from the position Pin to the position Pout, that is, in the range in which the nonwoven fabric 3 is integrally transported by the flat belt 52, the air flow is occurring to the nonwoven fabric 3 that passes through the nonwoven fabric 3 in the thickness direction thereof due to air intake through the suction holes on the flat belt 52. Accordingly, the nonwoven fabric 3 is evenly cooled in the thickness direction thereof, and also such air flow creates a condition of forced-convection heat transmission. The heat transmission coefficient thereof is very high, and therefore the nonwoven fabric 3 is cooled rapidly to normal room temperature.

Also, since the nonwoven fabric 3 is sucked by the flat belt 52 and transported nearly integral with the flat belt 52, even if the tension applied to the nonwoven fabric 3 is reduced, the trouble in transportation such as meandering or slack of the nonwoven fabric 3 is less likely to occur. Therefore, in here, the tension applied to the nonwoven fabric 3 while being transported by the belt conveyor 51 is reduced from the tension applied thereto in the preliminary drawing section S3. For example, the tension is set to a positive definite that is near approximately zero. And in this way, the plastic deformation caused by the tension of the polyurethane fiber, which is the stretchable fiber after drawing, is effectively suppressed, thereby more reliably imparting stretchability to the stretchable sheet 3a.

The tension applied to the nonwoven fabric 3 while being transported by the belt conveyor 51 is adjusted by, for example, a tension measuring sensor (not shown) provided in the vicinity of the guide roller 57 on the immediate upstream side of the belt conveyor 51 measures the extent of tension of the nonwoven fabric 3 in the vicinity of the belt conveyor 51, and performs adjustment such that the measured value of the tension is the target value of the desired tension, by performing feedback control of a circumferential velocity V5 of the driving roller 53a that circulates the flat belt 52.

However, it is also possible to adjust the tension to the above positive definite that is approximately near zero simply by setting the target velocity of the circumferential velocity V5 for the driving roller 53a, without using the tension measuring sensor. For example, by referring to FIG. 4A, it is clear that the load level significantly decreases when the tension is not applied compared to when the tension is applied. Accordingly, by setting the target velocity of the circumferential velocity V5 of the driving roller 53a smaller than the value obtained by multiplying the target velocity of the reference velocity V1 by the draw ratio Mt (=Mp×Mg), the tension applied to the nonwoven fabric 3 can be significantly decreased. Incidentally, in here, from the viewpoint of preventing slack in the nonwoven fabric 3 during transportation, it is preferable to set the target velocity of the circumferential velocity V5 higher than the target velocity of the circumferential velocity V4 of the gear rolls 41 and 43.

Also, of the guide rollers 58 and 59 positioned on the further downstream side than the driving roller 53a, it is preferable to control the drivingly rotating guide roller 59 so that the circumferential velocity V59 thereof is substantially equal to the circumferential velocity V5 of the driving roller 53a. In this manner, the plastic deformation caused by the tension of the polyurethane fiber that is the stretchable fiber after drawing is effectively suppressed, thereby more reliably imparting stretchability to the stretchable sheet 3a.

However, of the plurality of guide rollers 56 and 57 positioned between the gear drawing device 40 and the belt conveyor 51, it is preferable that the guide roller 56 positioned on the proximal downstream side of the gear drawing device 40 is caused to drivingly rotate, and the target velocity of a circumferential velocity V56 thereof is preferably set higher than the target velocity of the circumferential velocity V4 of the gear rolls 41 and 43. This is because there is a case that the nonwoven fabric 3 may stick to the teeth 41t and 43t of the gear rolls 41 and 43 during the gear drawing, and therefore the tension needs to be applied to the nonwoven fabric 3 in order to separate the nonwoven fabric 3 from the teeth 41t and 43t. For this reason, it is more preferable that a pressing roller 56b is provided that drivenly rotates while sandwiching the nonwoven fabric 3 between the guide roller 56, as shown in FIG. 6. In this manner, it is possible to suppress the relative slippage between the guide roller 56 and the nonwoven fabric 3, and as a result, the tension required for separation that is mentioned before can be reliably given to the nonwoven fabric 3.

(6) Rolling-Up Section S6

A rolling-up reel device 61 is provided in the rolling-up section S6. And the nonwoven fabric 3 transported from the cooling section S6 is rolled up in a roll form by the reel device 61 as the stretchable sheet 3a in which stretchability has been developed. Thereafter, the stretchable sheet 3a is delivered to another production line as a stretchable-sheet roll 3ar.

Other Embodiments

Embodiments of the present invention have been described as above, however the present invention is not limited to these embodiments and the following variations are also possible.

In the above embodiment, although the nonwoven fabric 3 that includes two types of fibers, the PP fiber as the extensible fiber and the polyurethane fiber as the stretchable fiber, has been illustrated as the nonwoven fabric 3 that includes a plural types of fibers, the number of types of fibers is not limited to two, and the nonwoven fabric 3 may include three or more types of fibers. By the way, the reasons for containing the PP fiber as the extensible fiber in addition to the polyurethane fiber as the stretchable fiber are, to suppress tackiness in the material caused by using only the polyurethane fiber by the PP fiber; to make discoloration (yellowing) due to ultraviolet in sunshine less noticeable that occurs by using only the polyurethane fiber by the PP fiber; and to increase the basis weight of the stretchable sheet 3a by containing the PP fiber so as to produce a bulky sheet.

In the above embodiments, the comingled-type nonwoven fabric 3 that consists of the PP fiber as the extensible fiber and the polyurethane fiber as the stretchable fiber being blended together has been illustrated as the nonwoven fabric 3 containing a plural types of fibers, however the nonwoven fabric 3 is not limited to the comingled-type. For example, a layer including only the extensible fiber and a layer including only the stretchable fiber may be separately faulted and layered in the thickness direction of the nonwoven fabric 3. Note that the number of these layers is not limited to two, and for example, the nonwoven fabric 3 may have a three-layer structure in which a layer including only the stretchable fiber is sandwiched between the upper and lower layers that include only the extensible fiber.

In the above embodiments, the stretchable sheet 3a in which stretchability has been developed is rolled up in a roll form in the rolling-up section S6, thereby transported to another line in the state of the stretchable-sheet roll 3ar. However, it is possible that the stretchable sheet 3a is not rolled up by the rolling-up reel device 61, and is continuously transported to another line in a continuous-sheet form (for example, the production line for the disposable diaper 1 and the like).

Furthermore, this manner is preferable for the reason stated below. In the case where the stretchable sheet 3a is rolled up in a roll form, a rolling-up tension needs to be applied to the stretchable sheet 3a. However, the size of the width of the stretchable sheet 3a or values of properties such as stretchability may vary during rolling up, due to fluctuation in the level of such rolling-up tension. For example, at the beginning of rolling up the stretchable sheet 3a by the rolling-up reel device 61, the stretchable sheet 3a is rolled up at a comparatively high rolling-up tension so as to prevent the stretchable sheet 3a from being slipped out of the paper tube (core for rolling up the stretchable-sheet roll 3ar) in a bamboo shoot form, which is caused by the stretchable sheet 3a being loosely rolled up. Therefore, generally, the width of the stretchable sheet 3a is narrower on the core side and wider on the outer circumference side of the stretchable-sheet roll 3ar. However, as stated above, such a problem of width variance can be avoided by transporting the stretchable sheet 3a to another production line in a continuous-sheet form rather than rolling up the stretchable sheet 3a by the rolling-up reel device 61.

In the above embodiments, in the heating rollers 21, each heating roller 21 is provided with a single heating element 24 with the axial center thereof being matched to the rotational axis C21 inserted thereinto, and in the gear rolls 41 and 43, each roll is provided with the heating elements 44 embedded at each of the positions that equally divide the entire circumference of the roll in the circumferential direction. However, the number of the heating elements 24 and 44 and embedding positions thereof are not limited as such, as long as the outer circumferential faces of the heating rollers 21 and the gear rolls 41 and 43 are evenly heated. For example, the configuration that the heating rollers 21 and the gear rolls 41 and 43 have may be opposite.

The invention claimed is:

1. A method of producing a stretchable sheet from a nonwoven fabric containing fibers, the nonwoven fabric having a longitudinal direction, a width direction and a thickness direction, the method comprising:
a first drawing step of drawing the nonwoven fabric in the longitudinal direction by (i) a pair of gear rolls and (ii) a roller that apply a tension to the nonwoven fabric in the longitudinal direction, and
a second drawing step of drawing, in the longitudinal direction, the nonwoven fabric that has been drawn in the first drawing step with a plurality of teeth formed on an outer circumferential face of each of the gear rolls, wherein the second drawing step includes passing the nonwoven fabric through a gap between the gear rolls that rotate while the plurality of teeth being engaged with one another,
wherein
said roller is arranged on an upstream side of said gear rolls in the longitudinal direction; and
in the first drawing step, the nonwoven fabric is drawn in the longitudinal direction by setting a circumferential velocity of the gear rolls higher than a circumferential velocity of the roller.

2. The method according to claim 1, wherein said fibers of the nonwoven fabric include
at least one type of stretchable fiber; and
at least one type of extensible fiber that undergoes plastic deformation at an elongation that is smaller than an elongation of the stretchable fiber at an elastic limit.

3. The method according to claim 2, wherein
the extensible fiber is a thermoplastic polyolefin fiber; and
in the first drawing step, the tension is applied to the nonwoven fabric that has been heated by a heater.

4. The method according to claim 3, wherein
the stretchable fiber is a thermoplastic elastomer fiber having a higher melting point than the thermoplastic polyolefin fiber.

5. A method according to claim 3, wherein the pair of gear rolls involved in the second drawing step includes a heater for heating the nonwoven fabric.

6. The method according to claim 3, further comprising:
a cooling step of cooling the nonwoven fabric that has been drawn in the second drawing step.

7. The method according to claim 6, wherein
in the cooling step, the tension of the nonwoven fabric is decreased from the tension applied in the first drawing step.

8. The method according to claim 6, wherein
in the cooling step, the nonwoven fabric is transported in a longitudinal direction while being sucked by a belt which moves in the longitudinal direction and on which a plurality of suction holes is formed; and
the nonwoven fabric is cooled by the air sucked through the suction holes while being transported by the belt.

9. The method according to claim 1, further comprising
in said first and second drawing steps, heating the nonwoven fabric by heating at least one of the gear rolls by a heating element arranged inside said gear roll.

10. The method according to claim 9, further comprising adjusting the heating element to adjust a temperature of the teeth of the gear rolls.

11. The method according to claim 1, further comprising
in said first and second drawing steps, guiding the nonwoven fabric by a guide roller to the gap between the gear rolls, wherein said guide roller is disposed between the roller and the gear rolls.

12. The method according to claim 1, wherein the gear rolls have an upper gear roll and a lower gear roll in the thickness direction, and said method further comprises adjusting the gap between the upper gear roll and the lower gear roll by an ascending and descending mechanism which moveably supports the lower gear roll.

13. The method according to claim 2, wherein the type of the extensible fiber includes fibers that are substantially non-elastically-extendable and the type of the stretchable fiber includes fibers that are elastically-extendable.

14. The method according to claim 4, further comprising a heating step of heating the nonwoven fabric by the gear rolls in the longitudinal direction, wherein the heating step includes a setting step of setting a temperature of the outer circumferential face of each of the gear roll based on the melting point of the thermoplastic elastomer fiber.

15. The method according to claim 14, further comprising another heating step of heating the nonwoven fabric, wherein the another heating step is performed before the first and second drawing steps.

16. The method according to claim 3, wherein said roller includes a heater.

17. The method according to claim 1, further comprising, in said second drawing step, deforming the nonwoven fabric by bending the nonwoven fabric at three points by the engaged teeth of the gear rolls while the nonwoven fabric is passed through the gap between the gear rolls.

* * * * *